US007933955B2

(12) United States Patent
Khalatian

(10) Patent No.: US 7,933,955 B2
(45) Date of Patent: Apr. 26, 2011

(54) ONE-CLICK UNIVERSAL SCREEN SHARING

(76) Inventor: Igor Khalatian, Morganville, NJ (US)

( * ) Notice: Subject to any disclaimer, the term of this patent is extended or adjusted under 35 U.S.C. 154(b) by 244 days.

(21) Appl. No.: 11/456,613

(22) Filed: Jul. 11, 2006

(65) Prior Publication Data
US 2008/0016155 A1    Jan. 17, 2008

(51) Int. Cl.
G06F 15/16    (2006.01)
(52) U.S. Cl. ......... 709/205; 709/203; 709/219; 709/224
(58) Field of Classification Search ............. 709/205
See application file for complete search history.

(56) References Cited

U.S. PATENT DOCUMENTS

| | | | |
|---|---|---|---|
| 5,838,906 A * | 11/1998 | Doyle et al. | 715/205 |
| 5,884,014 A * | 3/1999 | Huttenlocher et al. | 358/1.15 |
| 5,960,411 A | 9/1999 | Hartman et al. | |
| 6,331,855 B1 * | 12/2001 | Schauser | 345/502 |
| 6,460,081 B1 * | 10/2002 | Doherty et al. | 709/225 |
| 2002/0038346 A1 * | 3/2002 | Morrison et al. | 709/205 |
| 2003/0085923 A1 | 5/2003 | Chen et al. | |
| 2003/0093464 A1 * | 5/2003 | Clough et al. | 709/203 |
| 2004/0075619 A1 | 4/2004 | Hansen | |
| 2004/0080504 A1 * | 4/2004 | Salesky et al. | 345/418 |
| 2004/0253991 A1 | 12/2004 | Azuma | |
| 2005/0235014 A1 | 10/2005 | Schauser et al. | |
| 2005/0246634 A1 | 11/2005 | Ortwein et al. | |
| 2006/0031779 A1 | 2/2006 | Theurer et al. | |

OTHER PUBLICATIONS

"TightVNC Java Viewer version 1.2.9 Readme." TightVNC project: Aug. 10, 2003. <http://web.archive.org/web/20030810163821/tightvnc.com/doc/java/README.txt>.*
"Java applet screenshot." USENET thread: Aug. 12, 2004. <http://www.velocityreviews.com/forums/t136047-java-applet-screenshot.html>.*
"Bosco's Screen Share: Web Screen Sharing." Hutchings Software: Mar. 5, 2005. <http://web.archive.org/web/20050305232959/www.componentx.com/ScreenShare/web.php>.*
"PictureTalk FAQs." Pixion, Inc.: Mar. 5, 2005. <http://web.archive.org/web/20050305010259/www.pixion.com/supportFaq.html>.*
Siden, Larry. "Signed Applet Tutorial." Archived by the Internet Archive on May 13, 2006: <http://web.archive.org/web/20060513070748/http://www-personal.umich.edu/~lsiden/tutorials/signed-applet/signed-applet.html>. pp. 1-5.*
Free Web Conferencing and Always-On Collaboration; www.vyew.com; Jul. 25, 2006.

(Continued)

*Primary Examiner* — Hassan Phillips
*Assistant Examiner* — Christopher D Biagini
(74) *Attorney, Agent, or Firm* — Guerin & Rodriguez LLP; Michael A. Rodriguez

(57) ABSTRACT

Described are systems and methods for screen sharing between computing systems. A guest system and a host system are coupled to a server over a network. The guest system automatically executes program code embedded in a web page received from the server. The program code sends a request to the server for image data corresponding to an image on a display screen of the host system. The host system automatically executes program code embedded in a web page received from the server. The program code captures image data from the display screen of the host system and sends the captured image data to the server. The server sends captured image data received from the host system to the guest system in response to the request from the guest system. The guest and host systems can participate in a screen-sharing session without having to download and install special software.

20 Claims, 8 Drawing Sheets

OTHER PUBLICATIONS

"LiveLOOK is a leading provider of real-time . . . "; web page; www.livelook.com/about_us.asp; date web page visited: Jan. 7, 2010; 2 pages.

"Simple, single-purpose screen sharing"; web page article; www.infoworld.com/print/25674; published on InfoWorld; by Jon Udell; date web page visited: Jan. 3, 2010; 2 pages.

"Screen-Sharing: One-Click Solution . . . "; web page: www.masternewmedia.org; date web page visited: Jan. 6, 2010; 14 pages.

"Instant Screen Sharing with no download . . . "; web page; showscreen.com/screen_sharing_partners; date web page visited: Jan. 3, 2010; 3 pages.

"nGenera CIP Partners with LiveLOOK"; web page; www.reuters.com/article/pressRelease/idUS120651+14-Apr-2009+BW20090414; date web page visited: Nov. 17, 2009; 3 pages.

"Bold Software Partners with LiveLOOK to Enhance BoldCCM Product Suites"; web page; www.prweb.com/releases/BoldSoftware/LiveLOOK/prweb2536784.htm; date web page visited: Nov. 17, 2009; 2 pages.

"Instant Service Adds LiveLOOK's CoBrowsing Capabilities to Chat Solution"; web page; www.instantservice.com/news/20071106.html; date web page visited: Nov. 17, 2009; 2 pages.

"Press Release"; Web 2.0; Jun. 21, 2007; 1 page.

News Release; New Jersey Economic Development Authority; Nov. 2008; 2 pages.

"WebsiteAlive Chooses LiveLook to Offer . . . "; web page; websitealive.com/articles-press/websitealive-chooses-livelook; date web page visited: Jan. 3, 2010; 2 pages.

\* cited by examiner

FIG. 8

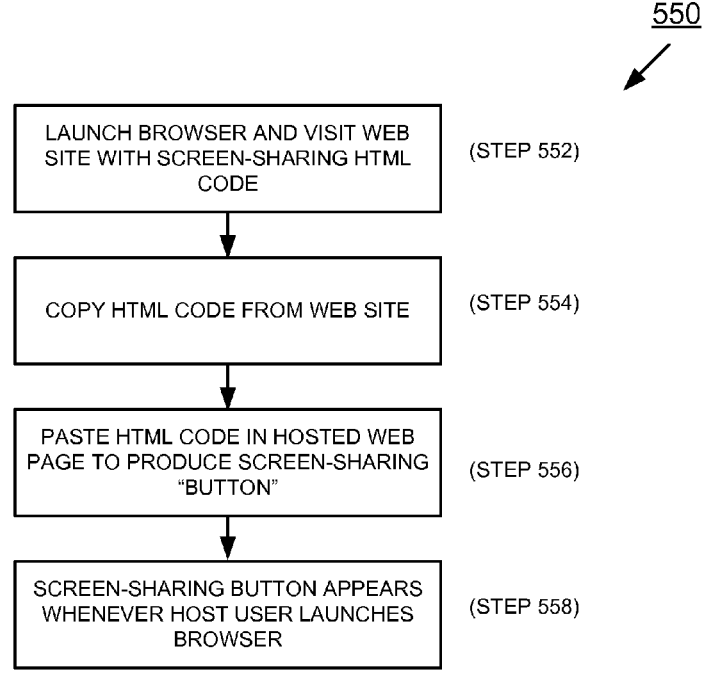

550

LAUNCH BROWSER AND VISIT WEB SITE WITH SCREEN-SHARING HTML CODE (STEP 552)

COPY HTML CODE FROM WEB SITE (STEP 554)

PASTE HTML CODE IN HOSTED WEB PAGE TO PRODUCE SCREEN-SHARING "BUTTON" (STEP 556)

SCREEN-SHARING BUTTON APPEARS WHENEVER HOST USER LAUNCHES BROWSER (STEP 558)

```
<a href="http://www.showscreen.com/showscreen/auto_host3.asp" target="_blank"
onClick="this.newWindow = window.open('http://www.showscreen.com/showscreen/
auto_host3.asp?url=' + document.location, 'ShowScreen',
'toolbar=0,scrollbars=0,location=0,statusbar=0,menubar=0,resizable=1,width=300,height=100');
this.newWindow.focus();this.newWindow.opener=window;return false;"><img alt="ShowScreen
by HelpMeeting"
src="http://www.showscreen.com/showscreen/images/iexplore.gif" width="88" height="31"
border="0"></a
```

FIG. 9

ONE-CLICK UNIVERSAL SCREEN SHARING

FIELD OF THE INVENTION

The invention relates generally to screen sharing between computing systems connected to a network. More specifically, the invention relates to screen sharing that does not require the computing systems to deliberately download and install software in order to participate.

COPYRIGHT NOTICE/PERMISSION

Portions of the disclosure of this patent document contain material that is subject to copyright protection. The copyright owner has no objection to the facsimile reproduction by anyone of the patent document or of the patent disclosure, as it appears in the Patent and Trademark Office patent file or records, but otherwise reserves all copyright rights whatsoever.

BACKGROUND

Screen sharing between computing devices has a myriad of practical applications. For one, screen sharing enables remote technical support. Another practical use is collaboration between a host and a viewer. A host can give a presentation to one or more remote viewers, perform demonstrations, review documents, and share images.

Numerous implementations of screen sharing presently exist. One well-known implementation is virtual network computing (VNC). VNC is a screen sharing system that enables a user to view and interact with another computer remotely over the Internet. VNC has two components: a server component and a client (i.e., viewer) component. User interface commands pass from the viewer computer to the remote computer, which sends back screen updates.

Like many screen-sharing implementations, however, setting up a VNC screen sharing system requires downloading and installing special software at one or both of the client and remote computer systems. Use of such client software can require changing the computer system's configuration or setting viewing preferences. Moreover, many standard and personal firewalls often block ports commonly used by some screen sharing systems, requiring an administrator to configure the firewalls explicitly to allow traffic on these ports. Still other screen-sharing systems are operating system dependent (e.g., MAC OS, Windows) and, therefore, are unable to gain widespread adoption.

SUMMARY

In one aspect, the invention features a method for sharing an image on a display screen of a computing system. A region on a web page displayed in a browser window on the display screen of the computing system is activated with an input device in order to host a screen-sharing session. In response to launching the screen-sharing session, program code is received automatically over a network. The program code is automatically executed by a browser upon receiving the program code. The execution of the program code captures an image on the display screen of the computing system.

In another aspect, the invention features a method for viewing at a local computing system an image on a display screen of a remote computing system. A region on a web page displayed in a browser window on a display screen of the local computing system is activated with an input device in order to a join a screen-sharing session. In response to activating the region on the web page, program code is received automatically over a network. The program code is executed automatically upon receipt by a browser to generate an HTTP request for image data. Image data corresponding to the display screen of the remote computing system are received in response to the request. The image data corresponding to the display screen of the remote computing system are displayed on the display screen of the local computing system.

In still another aspect, the invention features a method of conducting a screen-sharing session during which a user of a guest computing system can view an image displayed on a display screen of a host computing system. A first web page with embedded program code is sent to the host computing system, the program code capturing image data corresponding to the image displayed on the display screen of the host computing system. A second web page with embedded program code is sent to the guest computing system for generating a request for image data. From the host computing system are received image data representing a screen image of the host computing system. A request is received from the guest computing system for image data. Image data received from the host computing system are sent to the guest computing system in response to the request received from the guest computing system.

In yet another aspect, the invention features a screen-sharing system comprising a guest computing system and a host computing system coupled to a server system over a network. The guest computing system automatically executes program code embedded in a web page received from the server system. The program code sends a request to the server system for image data corresponding to an image on a display screen of the host computing system. The host computing system automatically executes program code embedded in a web page received from the server system. This program code captures image data from the display screen of the host computing system and sends the captured image data to the server system. The server system sends captured image data received from the host computing system to the guest computing system in response to the request from the guest computing system.

In still yet another aspect, the invention features a method for enabling screen-sharing functionality on a computing system. The method comprises pasting hypertext markup language (HTML) code into a web page accessed by the computing system through a Web browser. The HTML code produces a region on the web page, which, when activated, launches a screen-sharing session.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 8 is a flow diagram of a process by which the host computing system can become enabled for hosting screen-sharing sessions.

FIG. 9 is a listing of exemplary HTML (Hypertext Markup Language Text) code that can be used to enable a host computing system for hosting screen-sharing sessions.

DETAILED DESCRIPTION

Web-based screen-sharing systems constructed in accordance with the invention employ standard browser technology to share the screen image of a host computing system with one or more guest computing systems in near real-time. Because browser technology has become widespread, most any web-enabled computing system can participate in the screen sharing of the present invention. Participating computing systems do not need to deliberately download and install special software in order to become capable of screen sharing. Rather, such computing systems can engage in screen sharing using readily available standard browser plug-ins, executing universally accepted HTML code, and communicating in accordance with the universally adopted HTTP (HyperText Transport Protocol). Further, the screen sharing is operating system independent. Thus, in this sense, the screen sharing of the present invention is universal.

In brief overview, a guest computing system (a viewer) and a host computing system (a screen sharer) are coupled to a server system over a network. The host computing system and guest computing systems each communicates with the server system through their web browser. Upon visiting the server system, the host computing system automatically downloads and executes an applet that includes screen-capture program code-screen sharing in accordance with the invention works with the screen of the host computing system as an image. Currently available software (e.g., JAVA version 1.3 and higher) includes program code for capturing the pixel data of the host screen image. Upon automatically executing this host applet, the host computing system sends the captured image data to the server. Broadband Internet access through, e.g., cable and DSL (Digital Subscriber Line), provide sufficient bandwidth for transporting the image data.

During an established screen-sharing session, the browser of the guest computing system also downloads an applet from the server. This guest applet continuously sends requests for image data to the server. In response, the server supplies image data received from the host. The guest computing system repaints its display screen with the received image data, thus reproducing the image of the host screen at the guest computing system.

Figure 1:
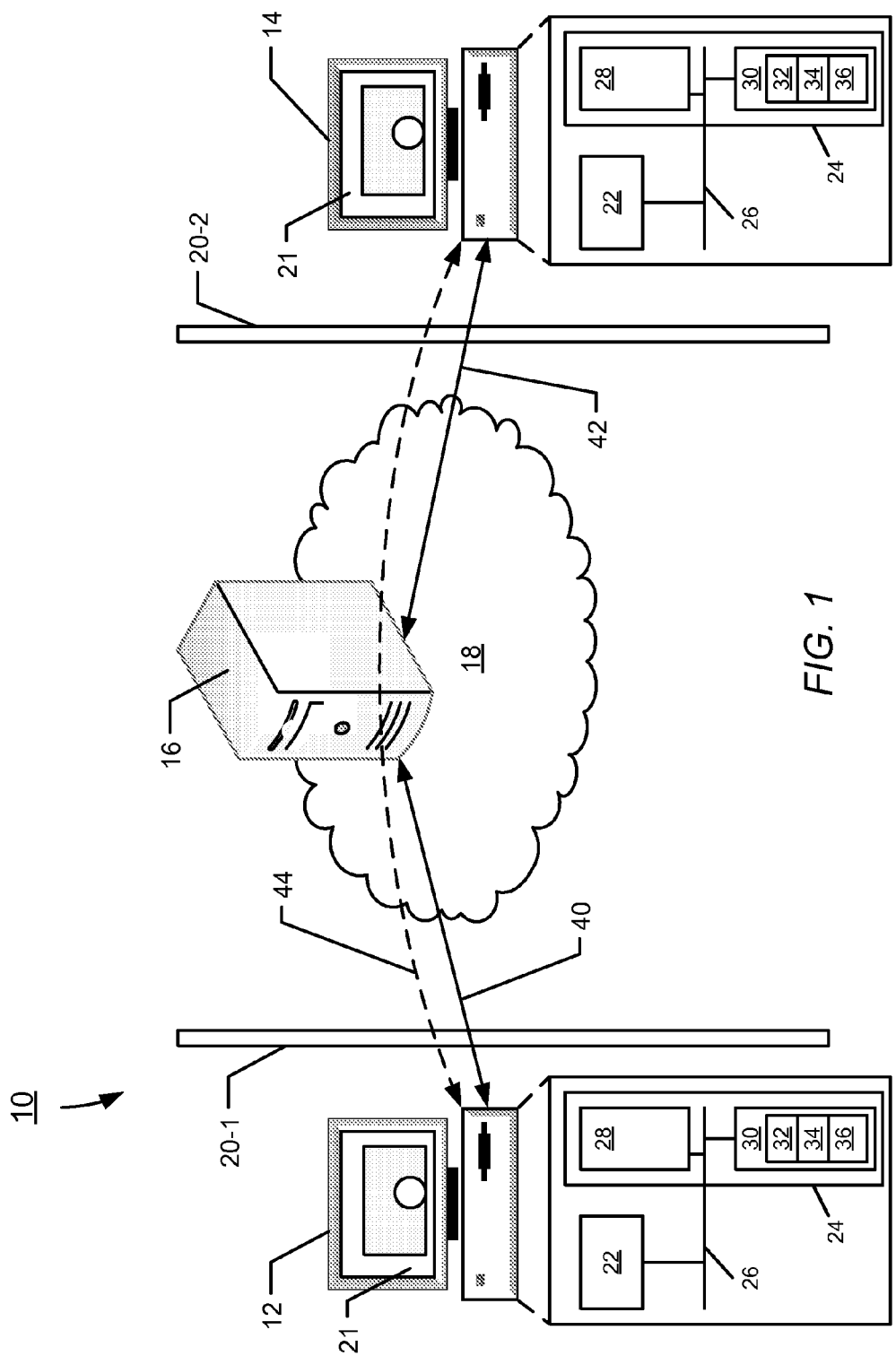
FIG. 1 is a block diagram representation of a screen-sharing system constructed in accordance with the invention.

FIG. 1 shows an embodiment of a screen-sharing system 10 configured for screen sharing in accordance with the present invention. The screen-sharing system 10 includes a host computing system 12 and a guest computing system 14 in communication with a server system 16 over a network 18.

Each of the host and guest computing systems 12, 14 may reside behind a respective firewall 20-1, 20-2. As described herein, the firewalls 20-1, 20-2 do not impede screen sharing between the host and guest computing systems 12, 14.

Each computing system 12, 14 includes a display screen 21 and a processor 22 in communication with system memory 24 over a signal bus 26. Exemplary implementations of the computing systems 12, 14 include, but are not limited to, personal computers (PC), Macintosh computers, workstations, laptop computers, kiosks, hand-held devices, such as a personal digital assistant (PDA), cellular phones, navigation and global positioning systems, and network terminals.

The system memory 24 includes non-volatile computer storage media, such as read-only memory (ROM) 28, and volatile computer storage media, such as random-access memory (RAM) 30. Typically stored in the ROM 28 is a basic input/output system (BIOS), which contains program code for controlling basic operations of the computing systems 12, 14 including start-up of the computing device and initialization of hardware. Stored within the RAM 30 are program code and data. Program code includes, but is not limited to, application programs 32, program modules 34 (e.g., browser plug-ins), and an operating system 36 (e.g., Windows 95, Windows 98, Windows NT 4.0, Windows XP, Windows 2000, Linux, and Macintosh).

Application programs 28 on the computing systems 12, 14 include browser software. The browser software can be any commercially available Web browser, e.g., Microsoft INTERNET EXPLORER®, Mozilla FIREFOX®, NETSCAPE®, and SAFARI®. Currently, most computing devices already have an installed browser when purchased from a manufacturer and deployed in the business, enterprise, or home. When the browser of a computing system visits a Web site with an embedded applet, the computing system automatically downloads the applet from the Web server and automatically executes it. Execution of the applet may require the support of various browser plug-ins 34 (e.g., JAVA, ACTIVEX).

In one embodiment, the browser of each computing system 12, 14 is a JAVA-enabled browser with an interpreter, e.g., a JAVA virtual machine, for interpreting JAVA bytecode (i.e., applets, scripts) and applications. Most commercially available Web browsers have the JAVA bytecode interpreter built into the Web browser. Because they are translated into an intermediate processor-independent bytecode supported by Java Virtual Machine, JAVA applets are operating system independent. In other embodiments, the browser of the guest computing system 14, the browser of the host computing system 12, or browsers of both computing systems 12, 14 are ACTIVEX-enabled, which execute downloaded ActiveX controls. In general, the principles of the invention apply to any browser capable of running applets or controls that perform screen capture.

Other application programs 28 can include, but are not limited to, an electronic mail client program, an instant messaging, and office applications, such as spreadsheet, word processor, and slide presentation software. Each application program 28 can be a proprietary or commercially available program and can run in conjunction with screen-sharing.

Typically, the signal bus 26 connects the processor 22 to various other components of the computing system 12, 14 including, for example, a user-input interface, a memory interface, a peripheral interface, a video interface, a local network interface, and a wide-area network interface (not shown). The display screen 21 connects to the signal bus 26 through the video interface. Exemplary implementations of the signal bus include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus. Over a wire or wireless link, the user-input interface is in communication with one or more user-input devices, e.g., a keyboard, a mouse, trackball, touch-pad, touch-screen, microphone, joystick, by which a user can enter information and commands into the computing system 12, 14. Each computing system 12, 14 can reside behind a firewall 20-1, 20-2, such as ZoneAlarm™, a MICROSOFT XP® built-in, or Norton Security™ firewalls, or external firewalls to isolate the computing system from the network 18.

Embodiments of the network 18 include, but are not limited to, local-area networks (LAN), metro-area networks (MAN), and wide-area networks (WAN), such as the Internet or World Wide Web. Each computing system 12, 14 can connect to the server 16 over the network 18 through one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g)).

In one embodiment, the server 16 is a Web server and includes a server engine. The server engine receives HTTP requests to access web pages identified by URLs and provides the appropriate web page to the requesting computing system 12, 14. The server engine can also send an identifier to each computing system 12, 14 when that computing system first communicates with the server 16. In subsequent communications with the server 16, each computing system 12, 14 includes its identifier so that the server 16 can identify the source.

In general, the server 16 orchestrates the screen-sharing session between the host and guest computing systems 12, 14. The server 16 establishes a first HTTP connection 40 with the host 12 and a second HTTP connection 42 with the guest 14. By the first connection 40, the server 16 continuously receives image (i.e., pixel) data corresponding to the screen image of the host 12. Over the second connection 42, the server 16 continuously receives requests for image data from the guest 14 and responds with image data received from the host 12. In effect, the server 16 is the hub of a connection 44 established between the host system 12 and the guest system 14 for purposes of screen sharing.

Figure 2:
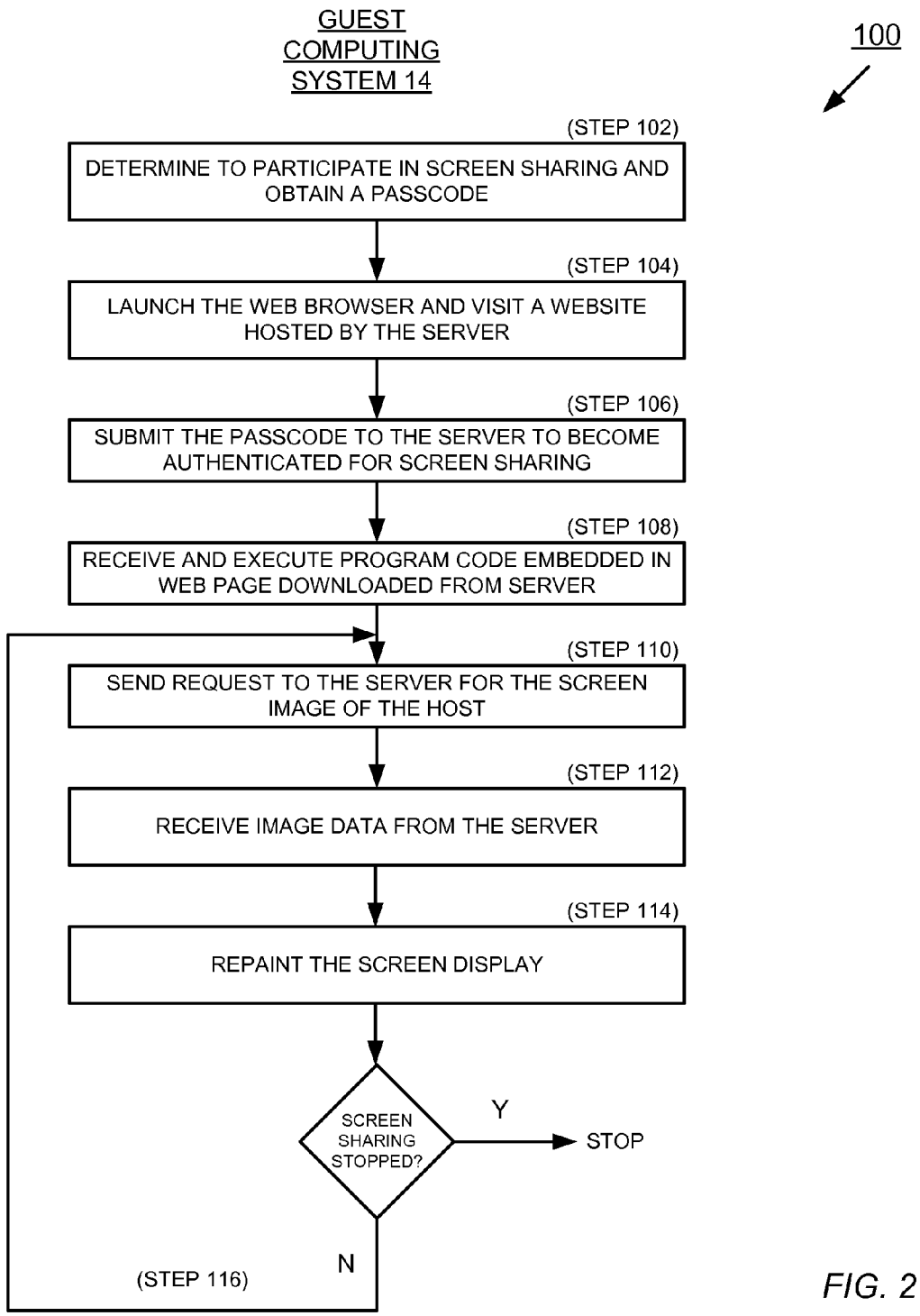
FIG. 2 is a flow diagram of an embodiment of a process by which a guest computing system participates in a screen-sharing session.

FIG. 2 shows an embodiment of a general process 100 of screen sharing in accordance with the present invention from the perspective of the guest 14. When a user of the guest system 14 decides to participate in sharing the screen of the host system 12, the user obtains (step 102) a session code (or passcode). The user can receive this session code by telephone, email, instant messaging, or any other mode of direct or indirect communication, typically, although not necessarily, with the user of the host system 12.

At step 104, the user of the guest 14 launches the browser software and visits a specific website hosted by the server 16. The browser can have a graphical screen-sharing button (e.g., within a toolbar) that, when pressed, sends an HTTP request to the server 16 to visit the specific website. Within the guest browser, a web page presents the guest with various options including an option to join a presentation. When the guest 14 chooses to join the presentation, the guest browser displays another web page having a field within which the guest 14 enters (step 106) the session code and, optionally, additional data, such as a Guest name (used, e.g., in Web Conferencing) and a special operator password (used, e.g., in customer-support situations).

When the session code is valid, the guest 14 receives, from the server 16, a web page with embedded program code (e.g., a JAVA applet), and automatically and continuously executes (step 108) this program code. Execution of the program code causes the guest 14 to establish a connection with server 16 and to send (step 110) an HTTP request regularly to the server 16 requesting pixel-level data corresponding to the screen image of the host screen. By convention, HTTP requests and responses transported over this connection are addressed to well-known port number 80 or to port 443 for secure https connections. Accordingly, for there to be any browser-to-Web server interaction over the network 18, port 80 needs to be open in the firewall 20-2. Consequently, screen-sharing traffic is able to pass through the firewall 20-2 unblocked.

In response to the HTTP request, the guest 14 receives (step 112) image data and screen coordinates from the server 16. The image data received can correspond to a portion of the display screen of the host computing system 12 or to the display screen in its entirety. The guest computing system 14 uses the screen coordinates to repaint (step 114) its display screen with the image data obtained from the server 16. Accordingly, the user of the guest computing system 14 sees the screen image of the host computing system 12.

Until the screen sharing session is terminated, the guest computing system 14 continuously sends (step 116) requests to the server, receives image data from the server, and repaints its display screen accordingly. In one embodiment, the guest 14 sends another request for image data to the server 16 as soon as the guest 14 repaints its display screen. That is, the guest 14 continuously issues requests as quickly as it is able. In another embodiment, the guest 14 sends a request periodically at a predetermined frequency (e.g., is). Any changes to the screen of the host 12 appear real-time in the browser window of the guest 14.

Advantageously, the user of the guest computing system 14 does not deliberately download and install software at the guest computing system 14 in order to participate in screen sharing. In contrast, the guest computing system 14 receives and executes the applet automatically in response to visiting the server web page, without the user of the guest 14 being aware of any downloaded applet.

Figure 3:
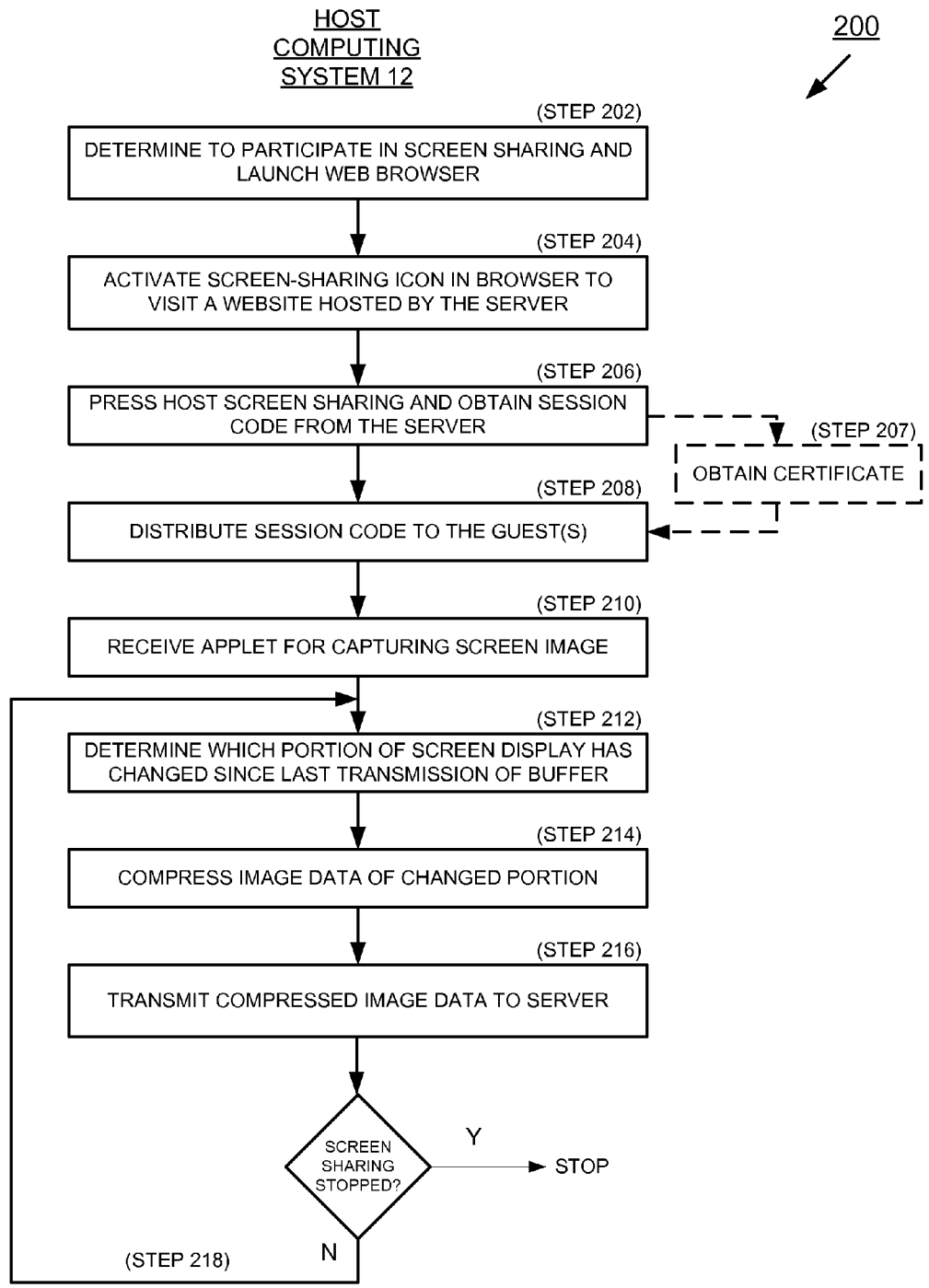
FIG. 3 is a flow diagram of an embodiment of a process by which a host computing system hosts the screen-sharing session.

FIG. 3 shows an embodiment of a general process 200 of screen sharing in accordance with the present invention from the perspective of the host computing system 12. At step 202, a user of the host 12 determines to host a screen-sharing session and launches the Web browser. The Web browser can display a graphical button that the user can press (step 204) to visit a screen-sharing web page hosted by the server 16. Alternatively, the user can enter the URL of the screen-sharing web page into the address field in the browser window, click on a link, or click on an icon in a browser toolbar, to list but a few mechanisms by which the user can visit the screen-sharing web page.

The screen-sharing web page can display various options, including an option to host a screen-sharing session. When the user chooses (step 206) the option to host a screen-sharing session, the host 12 receives a session code (which appears in a new web page presented to the host 12). In one embodiment, the host 12 receives the session code only if authorized to host screen-sharing sessions, as described below.

When the host 12 is establishing a screen-sharing session with the server 16 for a first time, a security certificate appears (step 207) at the host 12 (i.e., before the host 12 sees the session code). The user of the host 12 accepts the certificate to establish a secure connection with the server 16. In general, a security certificate appears for each new screen-sharing session, although the user of the host 12 can elect always to trust certificates from the server 16 so that subsequent screen-sharing sessions do not prompt a reappearance of the security certificate.

At step 208, the user of the host computing system 12 distributes the session code to the guest. (For multiple guests, the user of the host 12 distributes the same session code to each guest). Exemplary methods for distributing the session code are described above. It is to be understood that the distribution of the session code does not need to occur at this particular point in the process 200: the host 12 can begin sending image data to the server 16, as described below, before the session code is given to any guests.

At step 210, the host 12 receives and executes program code from the server 16 (e.g., a JAVA applet embedded in the new downloaded web page that displays the session code). The program code includes a screen-capture method for capturing a pixel-level snapshot of the screen of the host 12. In one embodiment, the screen-capture method employs a JAVA version 1.3 method called createScreenCapture( ). An input parameter to the JAVA createScreenCapture method is a rectangle that defines the screen boundaries within which pixels are to be captured. Thus, the createScreenCapture method can be used to capture a specific area of the screen or of a specific visual object. The createScreenCapture method returns a pixel buffer containing the image (i.e., pixel data).

In general, the size of captured pixel buffer can be large. For example, for a 32-bit color screen with a resolution of 1280×1024, the size of a pixel buffer is at least 5,242,880 bytes (32*1280*1024). Transmitting this amount of data with sufficient frequency to achieve an animated screen image at the guest 14 may be unfeasible in networks where the bandwidth is insufficient to support the pixel data traffic.

Rather than send the entire screen image upon each execution of the screen-capture method, in one embodiment, the host 12 determines (step 212) which sub-image of the screen image has changed since the last transmission of the pixel buffer and sends that sub-image to the server 16. To make this determination, the host 12 runs program code (downloaded to the host 12 with the screen-capture code or as a result of executing the screen-capture code) that isolates the area of change to a rectangular sub-image, as described in more detail below.

The host 12 compresses (step 214) the changed rectangular sub-image into a file, using either a JPEG (Joint Photographic Experts Group) or PNG (Portable Network Graphics) codec, and transmits (step 216) the compressed rectangle sub-image with its rectangle coordinates (x, y, height, and width) to the server 16. Depending on the contents of the screen image, the host 12 automatically and dynamically chooses the particular compression type. For example, JPG compression is preferred for high quality images and photographs, whereas PNG compression is preferred for the graphical applications, websites, etc. The connection between the host 12 and the server 16 transports HTTP requests and responses addressed to well-known port number 80 or to port 443 for secure https connections. Again, screen-sharing traffic is able to pass unblocked through any firewall 20-1 (FIG. 1).

The host computing system 12 continuously (step 218) determines screen image changes, compresses the image data, and sends the compressed image data to the server 16 until the screen-sharing session is terminated. In one embodiment, the host 12 starts determining screen image changes as soon as it transmits the compressed image data. That is, the host 12 continuously determines changes to the screen, compresses the changes, and forwards the changes to the server 16 as quickly as it is able. In another embodiment, the host 12 determines changes periodically at a predetermined frequency (e.g., is). After the host 12 starts sharing its screen, the screen continues to be shared provided the browser window remains open, although the browser window need not be the topmost window nor be maximized.

Figure 4A:
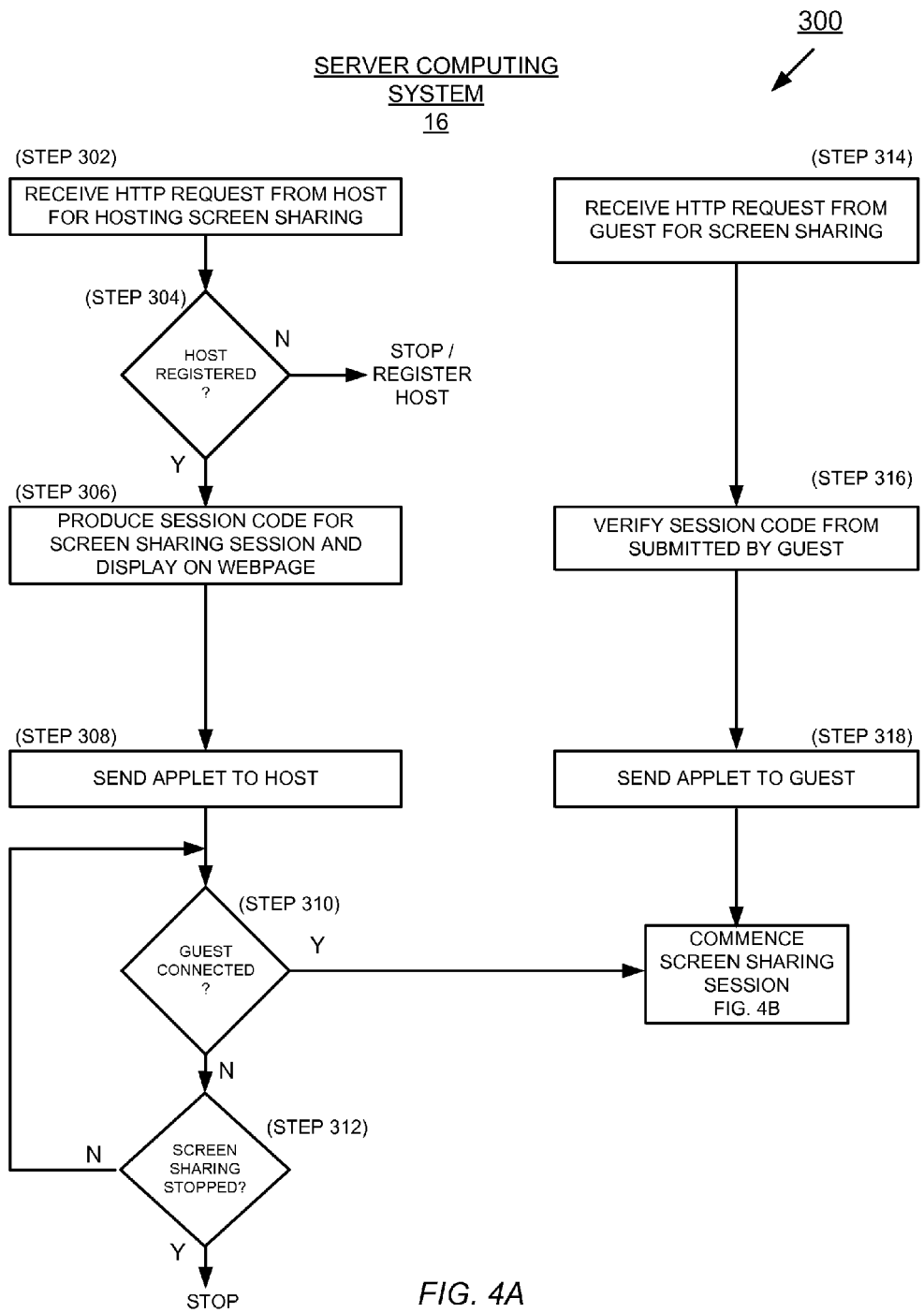
FIG. 4A and FIG. 4B are flow diagrams of an embodiment of a process by which a server system orchestrates a screen-sharing session between the host and guest computing systems.
Figure 4B:
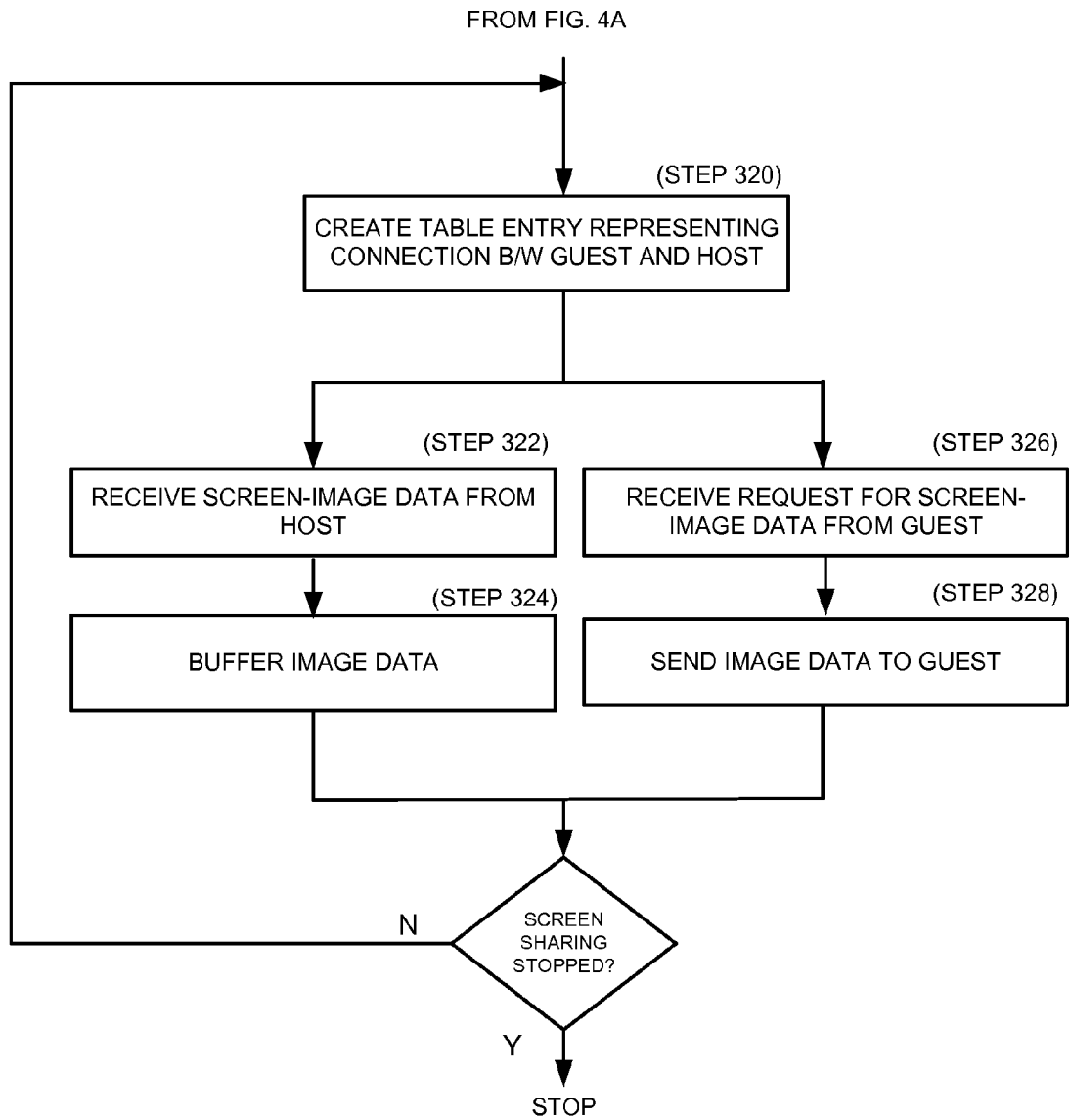

FIG. 4A and FIG. 4B show an embodiment of a general process 300 of screen sharing in accordance with the present invention from the perspective of the server computing system 16. The particular numbering of the steps of the process 300 is not intended to imply that the process 300 occurs serially. For instance, during part of the process 300, the server 16 is communicating with the host 12 while communicating with the guest 14.

At step 302, the server 16 receives an HTTP request from the host 12 for hosting a screen-sharing session. From the HTTP request, the server 16 is able to determine its originator (e.g., the HTTP request includes an identifier sent to the host 12 by the server 16 during a previous interaction between the two systems 12, 16). In a database of registered hosts, the server 16 determines (step 304) whether the originator of the HTTP request (here, the host 12) is authorized to host screen-sharing sessions. If the host 12 is not among the list of registered hosts, the server 16 can reject the connection or offer to register the host.

If the host 12 is a registered user, the server 16 produces (step 306) a session code (e.g., randomly generated) and sends the session code to the host 12, for display on the host screen. The server 16 also sends the screen-capture program code, described above, to the host 12. The server 16 determines (step 310) when a guest connects or is already connected to this session. Alternatively, the server 16 determines that the screen-sharing session terminates (step 312), because, e.g., the host 12 cancels the session.

At step 314, the server 16 receives an HTTP request from the guest 14 for joining a screen-sharing session and presents a web page with a field for receiving a session code. The server 16 verifies (step 316) a session code submitted by the user of the guest 14. If the session code corresponds to a session code given to the host 12, the server 16 sends (step 318) an applet to the guest 14. In addition, the server 16 uses the session code to link the guest 14 to the host 12. For example, the server 16 can maintain a table for tracking screen-sharing sessions and generate (step 320) a new entry in the table representing the screen-sharing session between the guest 14 and the host 12. The session code can be used as an index to the table entry. In addition, the session code can operate within the table to link multiple guests to a single host (in those instances when multiple guests are participating in a screen-sharing session).

During the screen-sharing session, the server 16 receives (step 322) screen image data from the host 12. The server 16 stores (step 324) screen image data updates received from the host 12 in a buffer. While communicating with the host 12, the server 16 is also communicating with the guest 14. At step 326, the server 16 receives a request from the guest 14 for screen image data.

In general, the server 16 forwards (step 328) image data received from the host 12 to the guest 14. More specifically, the server 16 makes a determination as to which image data to send. To illustrate, the server 16 can track the last update to the host screen image that the server 16 sent to the guest 12. When the server 16 receives a subsequent request for image data from the guest 14, the server 16 identifies which image updates it has received from the host 12 since sending the last update to the guest 14. If more than one screen image update has since arrived from the host 12, instead of sending the next update in the series of unsent updates, the server 16 analyzes the unsent updates to determine if any one of them can be bypassed of if certain updates could be efficiently combined.

As an oversimplified illustration, consider for example that the last screen image update sent to the guest is number 100, and that subsequent updates numbered 101 through 120 arrive at the server from the host. When the next request arrives from the guest 14, the server 16 does not merely send the screen image update number 101. Rather, the server 16 analyzes the newly arrived screen image updates (here, 101 through 120) to determine if any of the later screen image updates encompasses one or more of the previous updates.

For example, screen image update number 120 may be a full screen update sent by the host 12 to establish image synchronization with the guest 14. Consequently, it is enough for the server 16 to send screen image update number 120 to the guest 14, because the other updates 101 through 119 are no longer needed (being subsumed by the full screen update). On a lesser scale, one of the later screen image updates may relate to a sub-image that fully encompasses the sub-image of an earlier screen image update. The server 16 can also combine non-overlapping screen image updates.

By discarding subsumed screen image updates and combining updates wherever appropriate, the server 16 avoids needless expenditure of bandwidth. This mechanism is particularly useful when the host uploads screen image updates at a faster rate than the guest downloads updated screen image data, or, in general, when the speed of the host 12 and multiple guests differ substantially.

Figure 5:
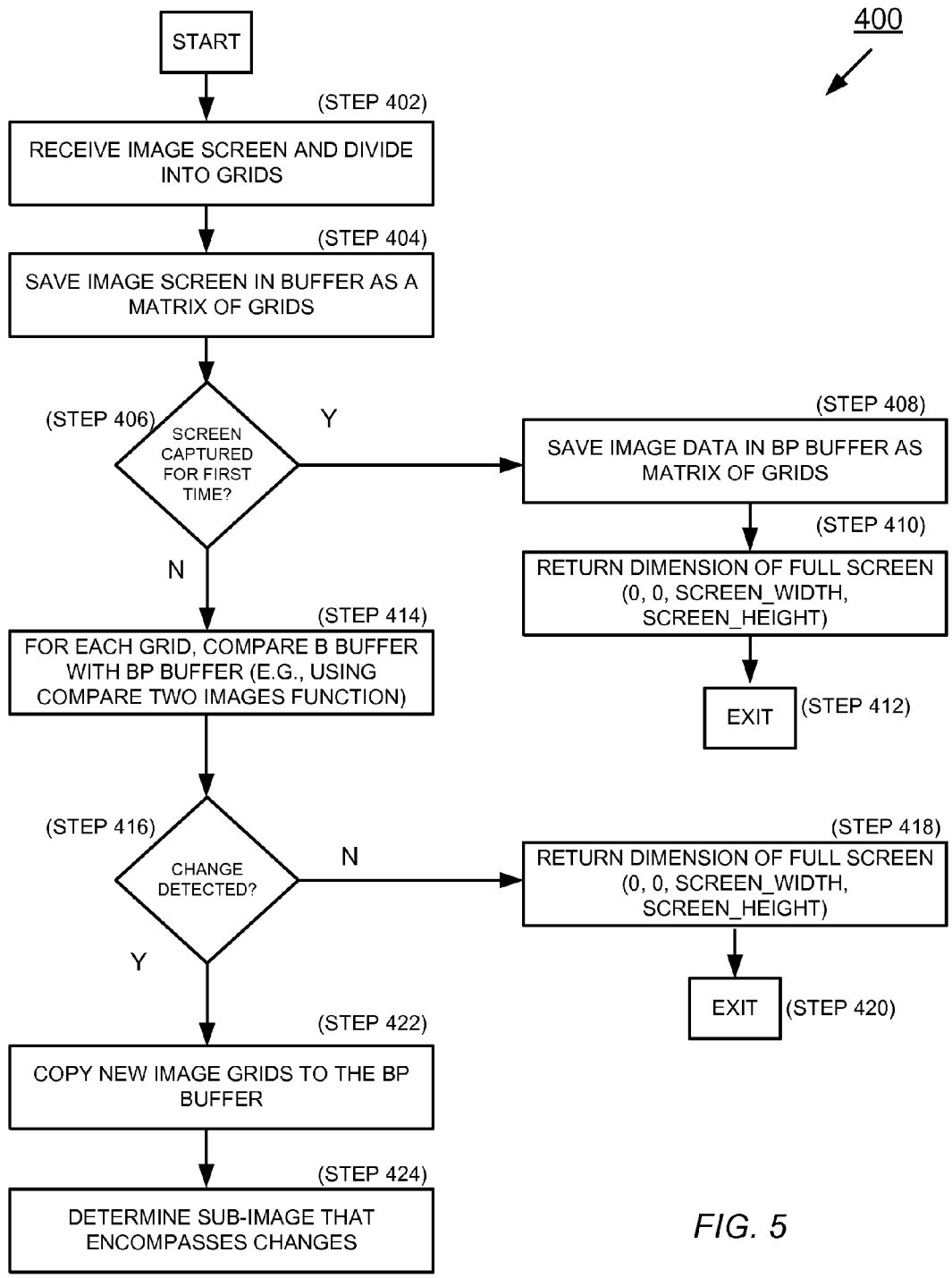
FIG. 5 is a flow diagram of an embodiment of a process by which the host computing system can identify changes in a screen image since the previous screen update.

FIG. 5 shows an embodiment of a general process 400 performed by the host 12 to determine which rectangular sub-image of the screen image has changed (since the last screen capture). At step 402, the host 12 receives a captured screen image and divides the screen into grids. The screen image is saved (step 404) to a buffer, b, as a matrix of grids. At step 406, the host 12 determines whether this is a first occurrence of a capture of the screen image. If this capture is the first occurrence, the image is saved (step 408) in a buffer, bp, as a matrix of grids. The program code executing at the host 12 returns (step 410) the coordinates of the full screen image. Full screen coordinates include the screen origin (0, 0), the screen width, and the screen height. The program code then exits (step 412).

If, instead, this capture is a subsequent occurrence, the image contents in the buffer, b, for each grid are compared (step 414) with the image content in the buffer, bp. A process for determining differences is described below in connection with FIG. 7. If, at step 416, no differences are detected for any of the grids, the program code returns (step 418) the coordinates of a full-screen image. If image data changes in any one or more of the grids, the new image grids are copied (step 422) to the buffer, bp. The program code then determines (step 424) a sub-image that encompasses the changes.

Various techniques can be used to find the sub-image that encompasses the pixel changes. For example, a first technique compares sub-images in grids one at a time, like squares in a chessboard, to determine whether that sub-image has changed.

Figure 6:
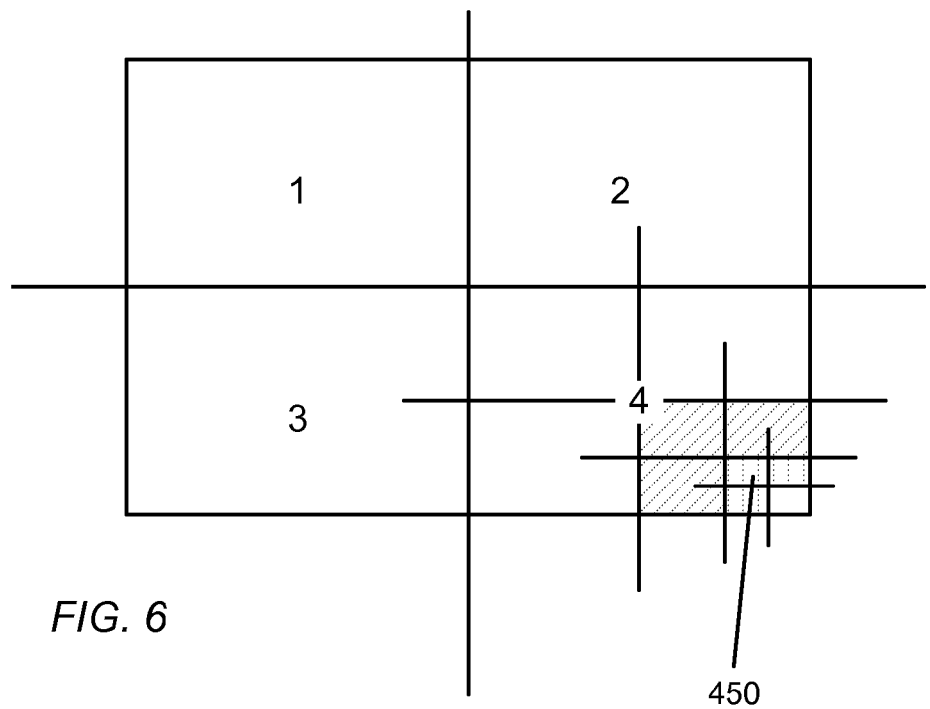
FIG. 6 is a diagram representing an embodiment of the screen image being iteratively partitioned when isolating a sub-image with detected image changes.

A second technique executes similarly to the first technique, except that the second techniques divides the screen image into grids by dividing the image into four sections, as shown in FIG. 6. Each sub-image that contains a difference is subdivided into quarters until a sub-image containing the pixel changes is small enough for transmission. FIG. 6 shows the fourth quadrant subdivided thrice to arrive at an acceptably sized sub-image 450 having changes for transmission to the server 16. This technique can arrive at small sub-images faster than the first technique, except that changes occurring near the middle of the screen can involve all four initial sub-images. In such instances, the first technique is preferred. In one embodiment, the host 12 combines the two techniques, adaptively selecting the technique that is more appropriate for the particular screen-sharing situation.

Figure 7:
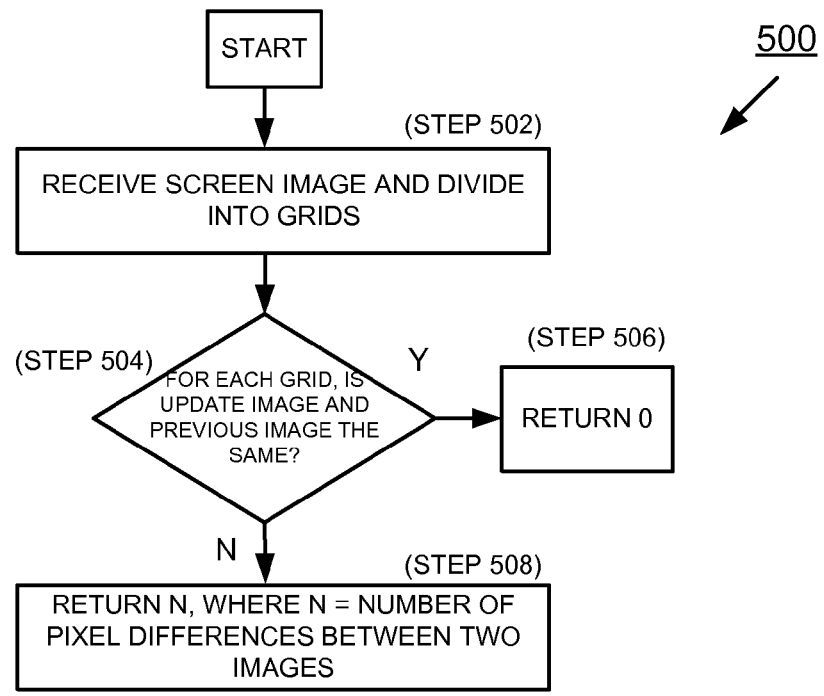
FIG. 7 is a flow diagram of an embodiment of a process by which the host computing system can identify changes in a screen image since the previous screen update.

FIG. 7 shows an embodiment of a process 500 by which the host computing system 12 detects pixel changes in the screen image. At step 502, the screen image is received and divided into grids. The image of each new grid is compared (steps 504) to the corresponding grid of the screen image in the buffer, bp. If no differences are detected, at step 506 the process 500 returns 0 (for no differences). If differences are found, at step 508 the process 500 returns N, where N is the number of pixel differences detected between the two compared grid images.

FIG. 8 shows an embodiment of a process 550 for enabling the host computing system 12 to conduct screen-sharing sessions in accordance with the invention. At step 552, the user of the host computing system 12 launches the web browser and visits a web page that has HTML code for conducting screen sharing in accordance with the invention. The user copies (steps 554) the HTML code from the web page (e.g., into the clipboard) and pastes (steps 558) that HTML code into a web page used by the host computing system 12 for hosting screen-sharing session. Alternatively, the HTML code can be e-mailed to the user. As another example, after the user registers with the server system 16, a browser window opens with instructions for copying and pasting the HTML code. Other methods of distributing the HTML code can be practiced without departing from the principles of the invention.

The HTML code produces a screen-sharing graphical button that appears whenever a user of a computing system visits the web page with the HTML code. Activating the graphical button (e.g., with one mouse click) launches a screen-sharing session. This embodiment of the HTML code does not authenticate the host at the server 16. Accordingly, anyone can host a screen-sharing session by visiting the web page and pressing the graphical screen-sharing button. This universality becomes particularly useful in customer support applications. In such customer support applications, an operator (i.e., an individual who is providing the customer support) may be required to provide an "operator's password" in order to see the screen (i.e., become a guest of the screen-sharing session).

As an illustrated example, most business enterprises maintain a web site that hosts one or more web pages that are accessible to their current and prospective customers. Any given enterprise can copy the screen-sharing HTML code into its "contact us" or "help" web page. A visitor of that web page sees the graphical screen-sharing button.

In one embodiment, activating the screen-sharing button invokes a pop-up window with a session code that the visitor can share with a guest (presumably, the host of the "contact us" web page). Instead of invoking a pop-up window, in another embodiment activation of the screen-sharing button switches the user to another host web page with the session code. The visitor shares this session code with an operator associated with the host. After the operator (turned guest) connects with the session code, the visitor (turned host) is sharing its screen. Before being allowed to view the screen, the operator is asked to provide a password to ensure that only an authorized operator, i.e., an authorized representative of the enterprise, provides the customer support. The screen sharing between the visitor-host and operator-guest can be used to supplement a telephone conversation between the parties. Alternatively, the visitor-host and operator-guest can engage in a chat session or exchange emails while screen sharing.

It is to be understood that such one-click screen-sharing can be added as a feature to web pages in a variety of forms, e.g., as a graphical button in a toolbar, as a menu item, as an icon on a search engine. Application programs, such as instant messaging and office applications, can be adapted to provide one-click screen sharing.

FIG. 9 shows an embodiment of HTML code that can be copied and pasted into a web page in order to provide screen-sharing capability at the host computing system. The exemplary URL within the HTML code (www.showscreen.com) is a URL for the server 16. The HTML code opens a new window and redirects the browser to the server 16 from which the host applet is downloaded. This embodiment of the HTML code does not authenticate the host.

Aspects of the present invention may be implemented, in whole or in part, as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims. For example, the guest computing system 14 can operate in a mode, called the HTTP mode, when a JAVA applet is not used. In this mode, the above-described functionality is achieved through JAVASCRIPT AND HTML.

What is claimed is:

1. A method for sharing an image on a display screen of a computing system, the method comprising:
   sending a request to host a screen-sharing session from a browser program running on the computing system to a server on a network;
   receiving over the network, in response to the request to host the screen-sharing session, a web page with embedded program code for use in capturing images displayed on the display screen;
   executing the embedded program code by one or more plugins supported by the browser program to host the screen-sharing session;
   hosting the screen-sharing session entirely through the browser program and the one or more plugins supported by the browser program by executing the embedded program code to repeatedly capture images displayed over time on the display screen of the computing system and to send image data corresponding to the captured images to the server on the network;
   determining based on a given snapshot of the display screen that image data has changed from a previous snapshot of the display screen; and
   adaptively selecting, in response to location on the display screen of the changed image data, an algorithm from a plurality of algorithms for isolating each sub-image of the given snapshot that contains some of the changed image data, a first algorithm of the plurality of algorithms comprising subdividing a captured image corresponding to the given snapshot of the display screen into sub-images of appropriate size for transmission to the server and examining each sub-image in sequence to determine whether that sub-image encompasses some of the changed image data, and a second algorithm of the plurality of algorithms comprising subdividing the captured image corresponding to the given snapshot of the display screen into sub-image quadrants and recursively subdividing each sub-image quadrant containing some of the changed image data into sub-image quadrants until a sub-image quadrant containing changed image data is of appropriate size for transmission to the server.

2. The method of claim 1, wherein sending the request to host the screen-sharing session from the browser program running on the computing system to the server on the network occurs in response to a single click of an input device that activates a region on a web page displayed in a browser window on the display screen of the computing system, the single click being sufficient to start the hosting of the screen-sharing session and the sending of image data corresponding to captured images to the server.

3. The method of claim 1, wherein the embedded program code detects changes in a captured image since a previously captured image.

4. The method of claim 3, wherein sending the image data corresponding to captured images to the server includes sending only the detected image changes to the server.

5. The method of claim 1, further comprising the step of compressing the image data corresponding to captured images before sending the image data to the server over the network.

6. The method of claim 5, wherein the step of compressing includes the step of selecting a file type in which to save the compressed image data.

7. The method of claim 6, wherein the file type is one of a JPG and a PNG file type.

8. The method of claim 1, further comprising the step of receiving a session code to be shared with a user of a guest computing system in order to allow the guest computing system to participate in the screen-sharing session.

9. The method of claim 1, wherein the program code includes a JAVA applet that uses a screen-capture method.

10. A method of conducting a screen-sharing session during which a user of a guest computing system can view an image displayed on a display screen of a host computing system, the method comprising:
   sending, in response to a request received from the host computing system to host a screen-sharing session, a first web page with embedded program code to the host computing system for capturing image data corresponding to an image displayed on the display screen of the host computing system, the embedded program code including program code configured to determine based on a given snapshot of the display screen that image data has changed from a previous snapshot of the display screen, and program code configured to adaptively select, in response to location on the display screen of the changed image data, an algorithm from a plurality of algorithms for isolating each sub-image of the given snapshot that contains some of the changed image data, a first algorithm of the plurality of algorithms comprising subdividing a captured image corresponding to the given snapshot into sub-images of appropriate size for transmission over a network and examining each sub-image in sequence to determine whether that sub-image encompasses some of the changed image data, and a second algorithm of the plurality of algorithms comprising subdividing the captured image corresponding to the given snapshot into sub-image quadrants and recursively subdividing each sub-image quadrant containing some of the changed image data into sub-image quadrants until a sub-image quadrant containing changed image data is of appropriate size for transmission over the network;

sending, in response to a request from the guest computing system to participate in the screen-sharing session, a second web page with embedded program code to the guest computing system for generating a request for image data;

receiving, over an HTTP (HyperText Transport Protocol) connection from the host computing system, image data corresponding to images displayed on the display screen of the host computing system, the image data having been repeatedly captured over time and transmitted over the HTTP connection in response to execution of the program code embedded in the first web page by one or more plugins supported by a browser program running on the host computing system;

receiving a request from the guest computing system for image data; and sending image data received from the host computing system to the guest computing system in response to the request received from the guest computing system.

11. The method of claim 10, further comprising the step of determining from multiple updates of image data received from the host computing system, which image data to send to the guest computing system.

12. The method of claim 10, further comprising the step of providing a session code to the host computing system.

13. The method of claim 10, further comprising the step of maintaining a registry of host computing systems authorized to host screen-sharing sessions.

14. The method of claim 13, further comprising the step of searching the registry using an identifier provided by the host computing system to determine whether the host computing system is authorized to host the screen-sharing session.

15. A screen-sharing system comprising:

a guest computing system and a host computing system in communication with a server system over a network, the guest computing system automatically executing program code embedded in a web page received from the server system, the program code sending a request to the server system for image data corresponding to an image on a display screen of the host computing system, the host computing system running a browser program having one or more plugins that execute program code embedded in a web page received from the server system in response to a request from the host computing system to host a screen-sharing session, the host computing system hosting the screen-sharing session entirely through the browser program and the one or more plugins, the browser program and the one or more plugins executing the program code to capture image data repeatedly over time from the display screen of the host computing system and to send the captured image data to the server system, the host computing system determining based on a given snapshot of the display screen that image data has changed from a previous snapshot of the display screen, and adaptively selecting, in response to location on the display screen of the changed image data, an algorithm from a plurality of algorithms for isolating each sub-image of the given snapshot that contains some of the changed image data, a first algorithm of the plurality of algorithms comprising subdividing a captured image corresponding to the given snapshot into sub-images of appropriate size for transmission to the server system and examining each sub-image in sequence to determine whether that sub-image encompasses some of the changed image data, and a second algorithm of the plurality of algorithms comprising subdividing the captured image corresponding to the given snapshot into sub-image quadrants and recursively subdividing each sub-image quadrant containing some of the changed image data into sub-image quadrants until a sub-image quadrant containing changed image data is of appropriate size for transmission to the server system, and the server system sending captured image data received from the host computing system to the guest computing system in response to the request from the guest computing system.

16. The screen-sharing system of claim 15, wherein the host computing system sends the request to host the screen-sharing session from the browser program running on the server system to the server on the network occurs in response to a single click of an input device that activates a region on a web page displayed in a browser window on the display screen of the host computing system, the single click being sufficient to start hosting the screen-sharing session and sending image data corresponding to captured images to the server system.

17. The screen-sharing system of claim 15, wherein the program code received from the server system in response to the request to host the screen-sharing session includes a JAVA applet that uses a screen-capture method.

18. The screen-sharing system of claim 15, wherein the embedded program code received from the server system in response to the request to host the screen-sharing session detects changes in captured image data.

19. The screen-sharing system of claim 18, wherein sending the captured image data to the server system includes sending only the detected image changes to the server.

20. The screen-sharing system of claim 15, wherein the host computing system compresses the captured image data before sending the captured image data to the server system over the network.

* * * * *